(12) United States Patent
Maas

(10) Patent No.: US 8,644,476 B2
(45) Date of Patent: Feb. 4, 2014

(54) METHOD AND SYSTEM FOR PROVIDING A VALUE ADDED SERVICE THAT IS AVAILABLE IN A FIRST NETWORK TO A SUBSCRIBER IN A SECOND NETWORK

(75) Inventor: Fedor Maas, Molenschot (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1382 days.

(21) Appl. No.: 10/596,461

(22) PCT Filed: Dec. 15, 2003

(86) PCT No.: PCT/NL03/00889
§ 371 (c)(1),
(2), (4) Date: Nov. 7, 2008

(87) PCT Pub. No.: WO2005/057953
PCT Pub. Date: Jun. 23, 2005

(65) Prior Publication Data
US 2011/0123013 A1 May 26, 2011

(51) Int. Cl.
*H04M 3/42* (2006.01)
*H04L 12/16* (2006.01)
*H04L 12/66* (2006.01)
*H04M 7/00* (2006.01)
*H04W 4/00* (2009.01)

(52) U.S. Cl.
USPC . 379/201.12; 370/259; 370/352; 379/211.02; 379/221.08; 379/221.09; 379/221.11; 455/414.1; 455/433

(58) Field of Classification Search
USPC ............ 379/201.01, 201.12, 207.02, 211.02, 379/219, 220.01, 221.08, 221.09, 221.11; 370/259, 352, 356; 455/414.1, 433
See application file for complete search history.

(56) References Cited

U.S. PATENT DOCUMENTS

| | | | | |
|---|---|---|---|---|
| 5,566,235 | A * | 10/1996 | Hetz | 379/221.02 |
| 5,901,359 | A * | 5/1999 | Malmstrom | 455/461 |
| 6,411,704 | B1 | 6/2002 | Pelletier et al. | |
| 6,529,732 | B1 * | 3/2003 | Vainiomaki et al. | 455/433 |
| 6,876,738 | B1 * | 4/2005 | Boland et al. | 379/221.01 |
| 6,956,939 | B1 * | 10/2005 | Boland et al. | 379/220.01 |
| 6,975,852 | B1 * | 12/2005 | Sofer et al. | 455/408 |
| 2002/0049065 | A1 * | 4/2002 | Wallenius | 455/461 |
| 2004/0242226 | A1 * | 12/2004 | Bot et al. | 455/432.1 |
| 2005/0147226 | A1 * | 7/2005 | Anupam et al. | 379/201.02 |

FOREIGN PATENT DOCUMENTS

WO WO 03/032656 A 4/2003

* cited by examiner

Primary Examiner — Harry Hong

(57) ABSTRACT

Method and communication system for providing a value added service, such as an intelligent network (IN) service, which is available in a first network (5), to a subscriber (3) in a second network (7). The first network (5) comprises a first network node (11) for executing the value added service. The method comprises detecting in a terminating call to the subscriber (3) that the subscriber (3) desires to use the value added service, forwarding control of the call towards the first network node (11) associated with a forwarding number in the first network (5), executing the value added service by the first network node (11), and, when necessary, further directing the call towards the subscriber (3) associated with the terminating call. The present method can also be applied to originating calls from a subscriber. In this case, the call is further directed towards a destination associated with the call.

31 Claims, 3 Drawing Sheets

METHOD AND SYSTEM FOR PROVIDING A VALUE ADDED SERVICE THAT IS AVAILABLE IN A FIRST NETWORK TO A SUBSCRIBER IN A SECOND NETWORK

FIELD OF THE INVENTION

The present invention relates to a method for providing a value added service, such as an intelligent network (IN) service, which is available in a first network, to a subscriber in a second network, in which the first network comprises a first network node for executing the value added service. Furthermore, the present invention relates to a communication system, comprising a first and a second network, the first network comprising a first network node being arranged to provide a value added service, such as an IN service. Also, the present invention relates to an exchange, an indexing register and a service node which is part of the present communication system.

BACKGROUND OF THE INVENTION

Value added services, such as Intelligent Network (IN) services are provided in mobile telecommunications networks, such as Public Land Mobile Networks (PLMN). Mobile telecommunications networks are connected to fixed telecommunications networks (such as Public Switched Telephone Network, PSTN) to allow fixed subscribers and mobile subscribers to communicate. However, thus far it is not possible to provide the fixed subscribers also with the IN services available to mobile subscribers and vice versa.

International patent application WO99/59357 describes a system and a method for wireline-wireless network interface. A wireline location register in the fixed network is used to direct a call to a fixed subscriber towards a (mobile) location of the subscriber using a wireless routing destination number. This allows a wireless subscriber to be accessed via a wireline telephone number. This publication does not disclose any details on providing value added services which are available in the wireless network to subscribers in the wireline network.

BRIEF SUMMARY OF THE INVENTION

The present invention seeks to provide a solution to providing value added services, such as IN services (e.g. Malicious call barring, personalized greeting service, VPN, etc.), which are available in a first network, to subscribers of a second network.

According to the present invention, a method according to the preamble defined above is provided, in which the method comprises detecting in a terminating call to the subscriber that the subscriber desires to use the value added service (e.g. using a prefix number, number based triggering, or a Call Forward Unconditional mechanism), forwarding control of the call towards the first network node associated with a forwarding number in the first network, executing the value added service by the first network node, and, when necessary, further directing the call towards the subscriber in the second network associated with the terminating call.

This allows to make terminating value added (IN) services available to a subscriber from a different network. In this first aspect of the present invention, e.g. a gateway interconnecting the first and second network can be used, which forwards a call to a subscriber by recognizing a special forwarding number, and directing the call to the first network node.

In an analogue manner, originating value added (IN) services can be made available to a subscriber in a different network using a further aspect of the present invention. For this, the method as described in the preamble above, further comprises detecting in an originating call from the subscriber that the subscriber desires to use the value added service, forwarding control of the call towards the first network node associated with a forwarding number in the first network, executing the value added service by the first network node, and, when necessary, further directing the call towards a destination associated with the call. This may be the destination as indicated in the originating call, or another destination as determined by the value added service.

In a further embodiment, the method further comprises directing the call to the first network node using an indexing register, in which the indexing register indicates the type of IN service associated with the forwarding number. An example of such an indexing register is a Home Location Register (HLR) in a PLMN offering IN services. In this case, the first network may be a public land mobile network (PLMN), the second network a public switched telephone network (PSTN), and the first network node is a Service Node (SN) of the PLMN. The HLR can then direct the call to the Service Control Point (SN) in the PLMN and signal one or more desired IN services. In a particular embodiment for terminating calls, the home location register (HLR) comprises a terminating IN Category Keying (TICK) associated with the forwarding number.

Alternatively, the first network is a public switched telephone network (PSTN) and the second network is a public land mobile network (PLMN). It is then possible to provide IN services which are available in the PSTN to a subscriber of the PLMN.

The Service Node can be a Service Control Point (SCP) or an Application Server (AS) or a Service Capability Server (SCS).

In the case of a terminating call to a subscriber, the call to a subscriber is, in a further embodiment, forwarded using a Call Forward Unconditional (CFU) mechanism. This mechanism is well understood by the person skilled in the art, and is implemented in a local exchange to which the subscriber is connected in case the second network is a PSTN, or is implemented in a Mobile Services Switching Center (MSC) in case the second network is a PLMN. The CFU mechanism may e.g. be initiated by the subscriber, using a known code sequence, such as *21* . . . #.

To be able to further direct the call towards the subscriber, e.g. after executing a screening of the originating number for Call Blocking purposes, the call is further directed towards the subscriber in an even further embodiment by overriding the Call Forwarding Unconditional mechanism. This is e.g. possible by setting the value of a call parameter 'number of redirection' to a maximum value plus one. E.g. setting the value to six in The Netherlands (where the maximum value is five) will override the CFU mechanism in the local exchange and allow a connection to the subscriber.

The value added (IN) services provided by the first network for terminating calls may comprise one or more of the following: Malicious Call Barring; Personalised Greeting Service; VPN.

The value added (IN) services provided by the first network for originating calls may comprise one or more of the following: Outgoing Call Screening; Short Number Dialing; VPN.

For originating calls, the detecting may in an embodiment comprise recognizing a match of at least part of a destination number in the call with a special predefined number. In this manner it is possible to trigger the value added service by using a special number for that service, or e.g. a prefix number. Alternatively, the detecting comprises recognizing a match of an originating number of the subscriber. This allows line based triggering of the service (in case of a PSTN), or special provisions in a HLR of a PLMN, e.g. Originating IN Category Key (OICK).

In a further aspect, the present invention relates to an exchange in a second network for providing communications to a subscriber, the second network being interconnectable with a first network having a first network node for executing a value added service, such as an intelligent network (IN) service, the exchange being arranged for detecting in a terminating call the desire of the subscriber to use a value added service provided by a first network node of the first network, forwarding control of the call towards the first network node associated with a forwarding number in the first network, and when necessary, after execution of the value added service by the first network node, further directing the call towards the subscriber in the second network associated with the terminating call. In an analogue manner, the exchange may be arranged to allow using value added services in another network triggered by originating calls. The exchange can e.g. be a local exchange in a fixed network (e.g. a PSTN) or an MSC in a mobile network (PLMN).

In an even further aspect, the present invention relates to an indexing register associated with a service node of a first network, for providing a value added service, such as an intelligent network (IN) service, which is available in the first network, to a subscriber in a second network, in which the service node is arranged for executing the value added service, the indexing register being arranged to indicate the type of value added service associated with a forwarding number to the service node after receiving control of a terminating call to the subscriber, the terminating call comprising an indication that that the subscriber desires to use the value added service. This embodiment allows to trigger the value added service by a terminating call to the subscriber. Alternatively, the value added service may be triggered by an originating call from the subscriber, when the indexing register is associated with a service node of a first network, for providing a value added service, such as an intelligent network (IN) service, which is available in the first network, to a subscriber in a second network, in which the service node is arranged for executing the value added service, the indexing register being arranged to indicate the type of value added service associated with a forwarding number to the service node after receiving control of an originating call from the subscriber, the originating call comprising an indication that that the subscriber desires to use the value added service.

In an even further aspect, the present invention relates to a communication system comprising a first and a second network, the first network comprising a first network node being arranged to provide a value added service, such as an IN service, the second network comprising an exchange according to the present invention and the first network node being arranged for executing the IN service.

Also, in a further embodiment, the communication system further comprises an indexing register according to the present invention.

BRIEF DESCRIPTION OF THE DRAWINGS

The present invention will be discussed in more detail below, using a number of exemplary embodiments, with reference to the attached drawings, in which.

DETAILED DESCRIPTION OF THE INVENTION

Figure 1:
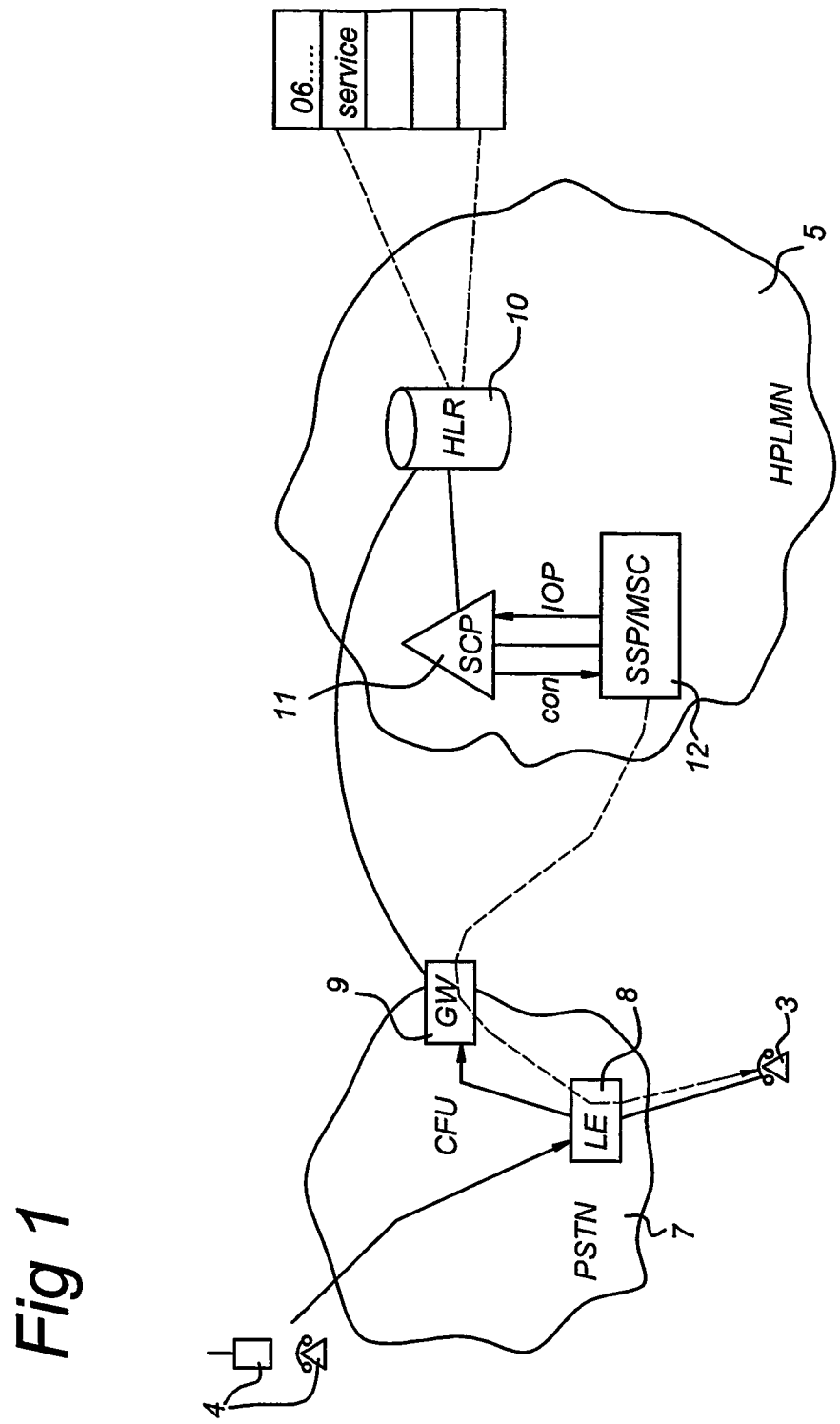
FIG. 1 shows a schematic view of a first embodiment of the communication system according to the present invention.

FIG. 1 shows a diagrammatic view of a first embodiment using the method according to the present invention. FIG. 1 shows a combination of a first network 5, in this case a Home Public Land Mobile Network (HPLMN), and a second network 7, in this case a Public Switched Telephone Network (PSTN).

The PSTN 7 is able to interconnect its subscribers (of which one is shown indicated by reference numeral 3) using a number of exchanges. A number of different classes of exchanges exist, however for the description of this embodiment of the present invention, in FIG. 1, only a local exchange 8 is shown, to which the subscriber 3 is connected. The PSTN 7 may be connectable to other networks using a gateway 9. The other networks may be other PSTN's (e.g. from other network operators) or other types of networks, such as the HPLMN 5 shown in FIG. 1.

The HPLMN 5 is arranged to provide communication connections primarily between mobile subscribers. For this, the HPLMN 5 comprises a Home Location Register 10, and a Mobile Services Switching Center 12. Nowadays, HPLMN 5 may be arranged to provide Intelligent Network (IN) services to subscribers of the HPLMN 5. For this, the HPLMN 5 comprises a Service Control Point (SCP) 11, which executes IN services and controls a Service Switching Point (SSP) 12. The SSP 12 is usually combined with the MSC for providing connections to the (mobile) subscribers. The operation of the HPLMN 5 and its components 10-12 are known to the person skilled in the art, and need no further detailed explanation beyond the explanation of the invention below.

Examples of IN services (a subclass of Value Added Services) include, but are not limited to, providing, Freephone (reverse charging), Premium Rate, Virtual Private Networks (VPN), Malicious Call Barring (MCB), Personalized Greeting Services (PGS), Time Dependent Routing, Call Forwarding etc.

In the normal situation, subscribers 3 of the PSTN 7 are not able to use any of the IN services implemented in the HPLMN 5. To provide these kind of services, separate computers or computer applications have to be added to the PSTN 7 which add these kind of functionalities.

To be able to use the IN services from the HPLMN 5, a subscriber 3 associated with the PSTN 5 (e.g. having a telephone number 010-1234567) has to indicate the wish to use a certain type of IN service. This can e.g. be accomplished by indicating that a call to that subscriber 3 must be forwarded to a special service number (e.g. 06-55 555 555). One method of accomplishing this is by notifying the local exchange 8, e.g. using the known call forward key sequence *21*0655555555#. This will result in a Call Forward Unconditional for every call the local exchange 8 receives, which is addressed to that subscriber 3.

When a mobile or fixed subscriber (indicated by reference numeral 4 in FIG. 1) places a call to the subscriber 3 (by dialing 010-1234567), this call will be forwarded by the local exchange 8 to the HPLMN 5, via gateway 9. The HPLMN 5 will use the HLR 10 in the known manner. In the HLR 10, which in this embodiment acts as an indexing register, an entry is present for the number 06-55555555 to which the call is forwarded, which will indicate that a specific IN service is desired (e.g. using a Terminating IN Category Key (TICK) entry in the HLR record for the number 06-55555555). As a result, the call will be forwarded to the SCP 11, which will execute that IN service for the subscriber 3.

For some IN services, such as Malicious Call Barring, which blocks calls from a predefined set of calling numbers (screening list), but passes calls from calling numbers not on the list, a connection needs to be established between the calling party and the subscriber 3. Without further measures, a call forwarded to the subscriber 3 by the SSP/MSC 12 will again be redirected as a result of the Call Forwarding Unconditional programmed for that subscriber 3.

In telephony networks, such as HPLMN 5 and PSTN 7, use is made of a parameter 'number of redirections' to indicate how many times a call has been redirected. This to prevent infinite loops when subscribers 3 redirect their incoming phone calls. The maximum value of this parameter is usually set for a geographical area (e.g. for The Netherlands, the maximum number of redirections is five).

To allow the SCP 11 (or better the SSP/MSC 12) to further direct the call to the subscriber 3, the value of the parameter 'number of redirections' is set to a value equal to the maximum value plus one (thus, in The Netherlands it will be set to six). This allows the SSP/MSC 12 to further direct the call via the gateway 9 and local exchange 8 to the subscriber 3.

In some proposals for IN services, it has been proposed to provide a fixed telephone network, such as PSTN 7, with the necessary hardware and software to provide IN services to subscribers. In this case, the fixed telephone network is provided with a location register (another type of indexing register comparable to the HLR 10 in HPLMN 5), which directs calls to a certain service number in the PSTN to an IN control point (a service node (SN) comparable to the SCP 11 in the HPLMN 5).

In this cases it is possible to provide subscribers of other networks (fixed or mobile) which do not provide those IN services, with the possibility of using the IN services in a manner analogous to the embodiment described with reference to FIG. 1. In this embodiment, a call to the subscriber is forwarded to the IN control point using the location register, after which the IN service can be executed.

Figure 2:
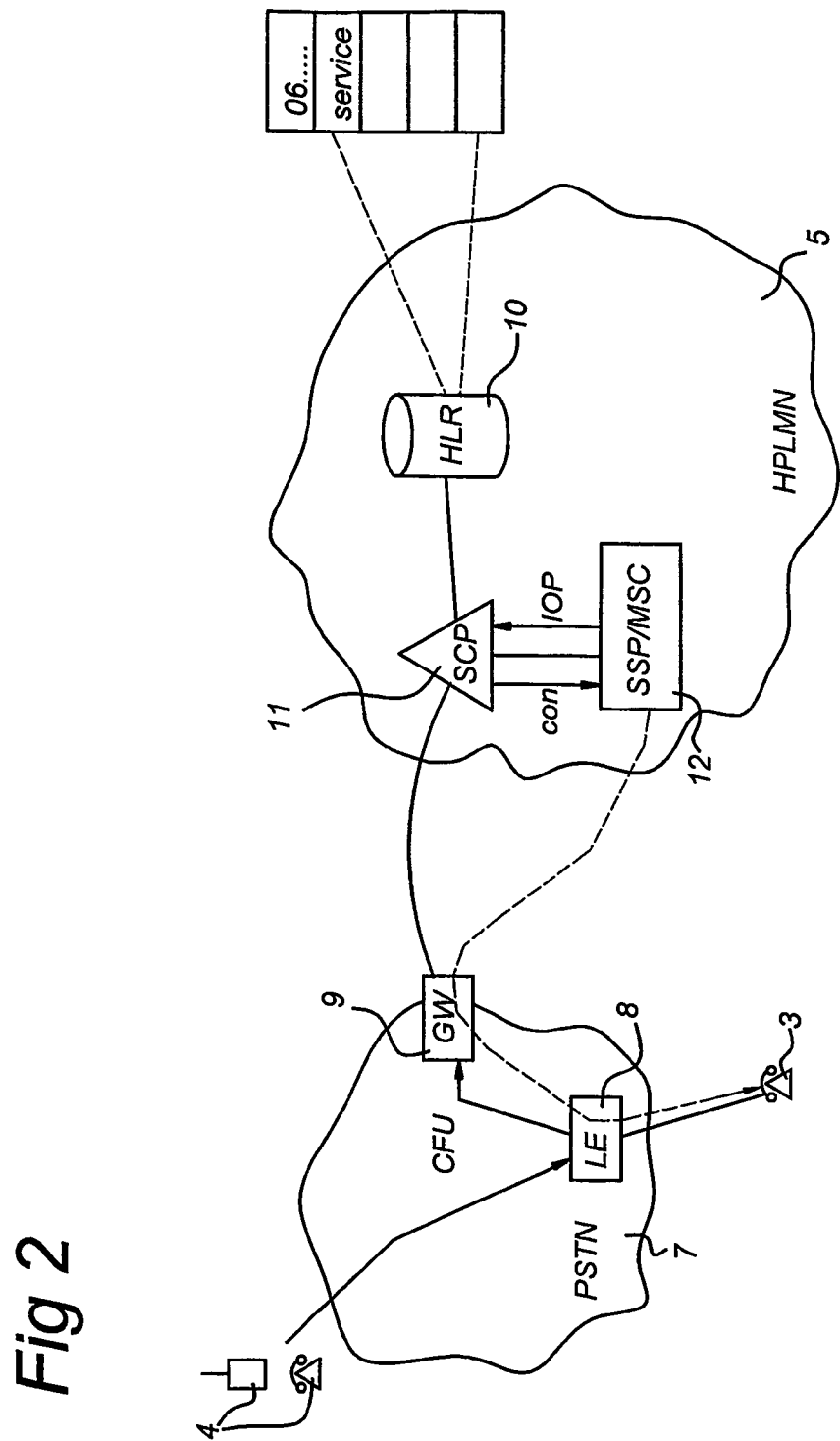
FIG. 2 shows a schematic view of a second embodiment of the communication system according to the present invention.

In a further embodiment, which is schematically depicted in FIG. 2, use is made of number based triggering. In this case, the indexing register function indicating the specific IN service desired is not provided by the HLR 10, but already by the gateway 9. The gateway 9 recognizes a special number (the forwarding number indicating a specific IN service) and directly forwards the call to the SCP 11 in the HPLMN 5.

In the above description of the embodiment of the invention, the call is a terminating call to the subscriber 3. However, it is also possible to provide value added services such as IN services in a first network 5 for originating calls from subscribers 3 in the second network 7. An originating call is executed for the calling/originating subscriber during a call or the set-up of the call. Examples of IN services associated with originating calls are Outgoing Call Screening (screening whether destination number is allowed); use of short numbers within a user group (Family & Friends); or a Virtual Private Network (VPN) (which can actually be both an originating or a terminating service).

Figure 3:
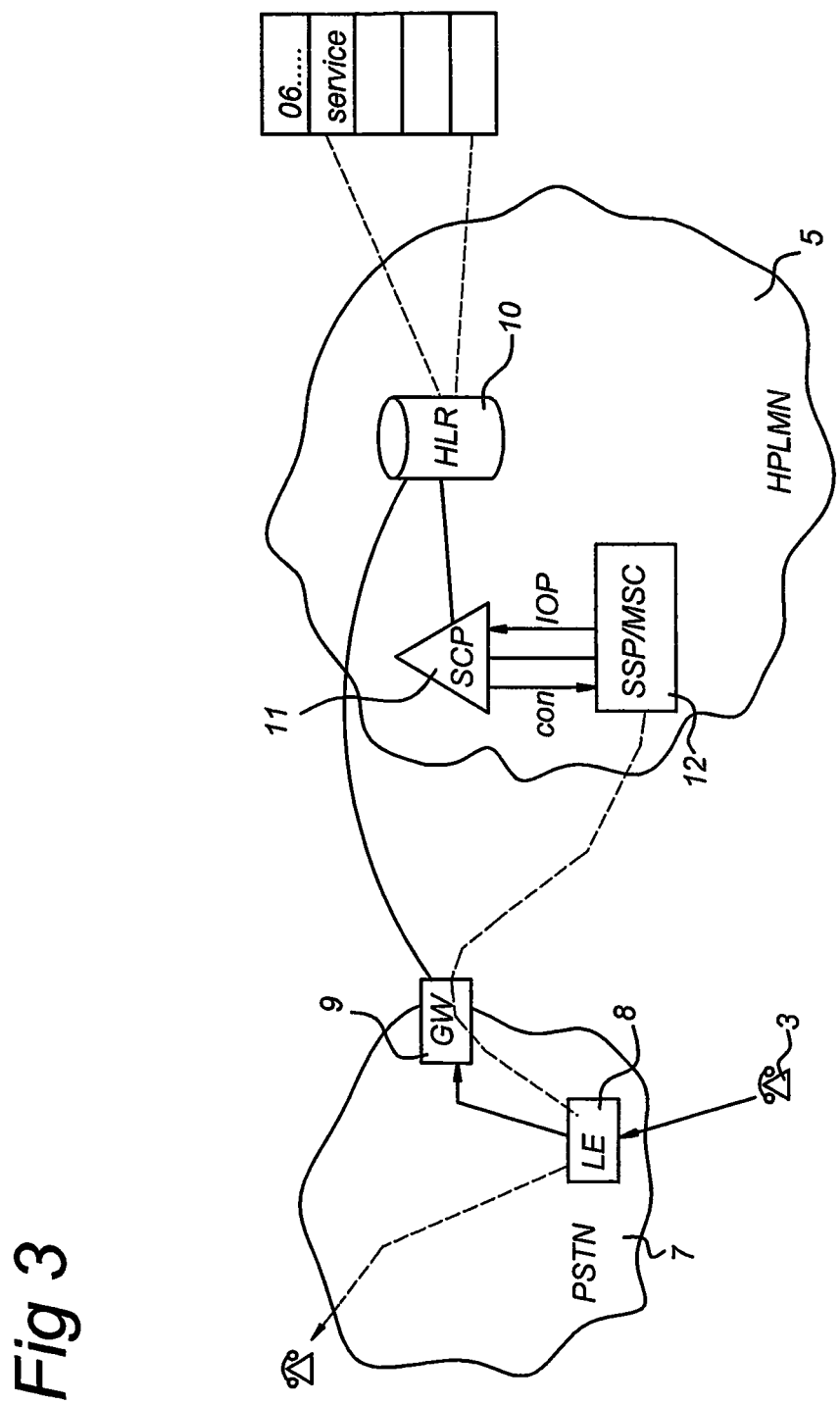
FIG. 3 shows a schematic view of a third embodiment of the communication system according to the present invention relating to originating calls.

This is illustrated in FIG. 3, in which a subscriber 3 initiates a call (indicated by arrow towards local exchange 8) with subscriber 4 as destination. However, using one of the methods described below in further detail, the local exchange intercepts the originating call from subscriber 3 and hands over control of that call to the HLR 10 in PLMN 5 for execution of an IN service using e.g. the special number 06-55555555 as discussed above. In the HLR 10, it is indicated which IN service is associated with that specific number, and the SCP 11 is allowed to execute the originating IN service for that subscriber 3. After that, control is passed back to the SSP/MSC 12, in order to allow completion of the call to the destination subscriber 4 (e.g. again via gateway 9 and local exchange 8 as indicated in FIG. 3). It will be apparent that an embodiment for originating calls may be implemented analogue to the embodiment of FIG. 2, in which the control of the originating call is directly handed over to the SCP 11.

To allow services associated with originating calls to be executed in the first network 5, a number of possible mechanisms may be used. The first one is to detect a special sequence in the dialed number, such as a special telephone number indicating the desired service, or a prefix/suffix sequence.

A prefix may be added to a telephone number dialed by the subscriber 3 automatically by the local exchange 8 to which the subscriber 3 is connected (fixed network) or by the MSC 12 momentarily servicing the subscriber (mobile network). Alternatively, the terminal of the subscriber 3 may be arranged to automatically add the prefix, or the subscriber may key in the prefix.

The special sequence (number or prefix) is recognized by the local exchange 8 or MSC 12, and the control of the call is transferred to the associated service node (SCP 11) in the first network 5, which then executes the value added service.

When the second network 7 is a fixed network (PSTN), the originating service may also be triggered using line based triggering. In the local exchange 8, an adjustment is made for specific subscribers 3 to redirect control of calls originated by the respective subscribers to the service node 11 in the first network 5.

An analogue provision may be made for subscribers of a mobile network, who wish to use a value added service in the first network. In the HLR of the PLMN, the record of a specific mobile subscriber is adjusted by setting an Originating IN Category Key (OICK) parameter. All call originating from that subscriber will then trigger the SCP in the PLMN to redirect control of the call to the service node in the other network for executing the value added service. Additional parameters in the HLR indicate where this service node in the fixed network can be located and which value added services are applicable.

The invention claimed is:

1. A method for providing a value added service, which is available in a first network, to a subscriber in and subscribed to a second network, in which the first network comprises a first network node for executing the value added service, the method comprising:
   detecting in a terminating call to the subscriber that the subscriber desires to use the value added service;
   forwarding control of the terminating call towards the first network node associated with a forwarding number in the first network;
   executing the value added service by the first network node, and, when necessary, further directing the terminating call towards the subscriber in the second network associated with the terminating call,
   wherein the subscriber is subscribed to the second network and is not subscribed to the first network.

2. The method according to claim 1, further comprising directing the call to the first network node using an indexing register, in which the indexing register indicates the type of value added service associated with the forwarding number.

3. The method according to claim 2, in which the first network is a public land mobile network (PLMN), the second network is a public switched telephone network (PSTN), the indexing register is a home location register (HLR) of the PLMN, and the first network node is a Service Node (SN) of the PLMN.

4. The method according to claim 3, wherein the home location register (HLR) comprises a terminating IN Category Keying (TICK) associated with the forwarding number.

5. The method according to claim 1, wherein the first network is a public switched telephone network (PSTN) and the second network is a public land mobile network (PLMN), and the first network node is a Service Node of the PSTN.

6. The method according to claim 3, wherein the Service Node is a Service Control Point (SCP) or an Application Server (AS) or a Service Capability Server (SCS).

7. The method according to claim 1 wherein the call to a subscriber is forwarded using a Call Forward Unconditional (CFU) mechanism.

8. The method according to claim 7, wherein the CFU mechanism is initiated by the subscriber.

9. The method according to claim 1 wherein the call is further directed towards the subscriber by overriding the Call Forwarding Unconditional mechanism.

10. The method according to claim 1 wherein the value added service comprise one or more of the following: Intelligent Network service; Malicious Call Barring; Personalised Greeting Service; VPN.

11. A method for providing a value added service, which is available in a first network, to a subscriber in and subscribed to a second network, in which the first network comprises a first network node for executing the value added service, the method comprising:
   detecting in an originating call from the subscriber that the subscriber desires to use the value added service;
   forwarding control of the originating call towards the first network node associated with a forwarding number in the first network;
   executing the value added service by the first network node, and, when necessary, further directing the originating call towards a destination associated with the originating call,
   wherein the subscriber is subscribed to the second network and is not subscribed to the first network.

12. The method according to claim 11, wherein the detecting comprises recognizing a match of at least part of a destination number in the call with a special predefined number.

13. The method according to claim 11, wherein the detecting comprises recognizing a match of an originating number of the subscriber.

14. The method according to claim 1, further comprising directing the call to the first network node using an indexing register, in which the indexing register indicates the type of value added service associated with the forwarding number.

15. The method according to claim 14, wherein the first network is a public land mobile network (PLMN), the second network is a public switched telephone network (PSTN), the indexing register is a home location register (HLR) of the PLMN, and the first network node is a Service Node (SN) of the PLMN.

16. The method according to claim 11 wherein the first network is a public switched telephone network (PSTN) and the second network is a public land mobile network (PLMN), and the first network node is a Service Node of the PSTN.

17. The method according to claim 15 wherein the Service Node is a Service Control Point (SCP) or an Application Server (AS) or a Service Capability Server (SCS).

18. The method according to claim 11 wherein the value added service comprise one or more of the following: intelligent network (IN) service; Outgoing Call Screening; Short Number Dialing; VPN.

19. An exchange in a second network for providing communications to a subscriber, the second network being interconnectable with a first network having a first network node for executing a value added service, the exchange being arranged for:
   detecting in a terminating call the desire of the subscriber to use a vale added service provided by a first network node of the first network;
   forwarding control of the terminating call towards the first network node associated with a forwarding number in the first network; and
   when necessary, after execution of the value added service by the first network node, further directing the terminating call towards the subscriber in the second network associated with the terminating call,
   wherein the subscriber is subscribed to the second network and is not subscribed to the first network.

20. An exchange in a second network for providing communications to a subscriber, the second network being interconnectable with a first network having a first network node for executing a value added service including that of an intelligent network service, the exchange being arranged for:
   detecting in an originating call the desire of the subscriber to use the value added service provided by a first network node of the first network;
   forwarding control of the originating call towards the first network node associated with a forwarding number in the first network; and
   when necessary, after execution of the value added service by the first network node, further directing the originating call towards a destination associated with the originating call,
   wherein the subscriber is subscribed to the second network and is not subscribed'. to the first network.

21. The exchange according to claim 20, wherein the first network is a public land mobile network (PLMN), the second network is a public switched telephone network (PSTN), and the first network node is a Service Node (SN) of the PLMN.

22. The exchange according to claim 20, wherein the first network is a public switched telephone network (PSTN) and the second network is a public land mobile network (PLMN), and the first network node is a Service Node of the PSTN.

23. An indexing register associated with a service node of a first network, for providing a value added service including that of an intelligent network (IN) service, which is available in the first network, to a subscriber in and subscribed to a second network, in which the service node is arranged for executing the value added service, the indexing register being arranged to indicate the type of value added service associated with a forwarding number to the service node after receiving control of a terminating call to the subscriber, the terminating call comprising an indication that the subscriber desires to use the value added service, wherein the subscriber is subscribed to the second network and is not subscribed to the first network.

24. An indexing register associated with a service node of a first network, for providing a value added service, including that of an intelligent network (IN) service, which is available in the first network, to a subscriber in and subscribed to a second network, in which the service node is arranged for executing the value added service, the indexing register being arranged to indicate the type of value added service associated with a forwarding number to the service node after receiving control of an originating call from the subscriber, the originating call comprising an indication that the subscriber desires to use the value added service, wherein the subscriber is subscribed to the second network and is not subscribed to the first network.

25. The indexing register according to claim 24, in which first network is a public land mobile network (PLMN), the second network is a public switched telephone network (PSTN), the indexing register being a home location register (HLR) of the PLMN, and the first network node is a Service Node (SN) of the PLMN.

26. The indexing register according to claim 25, in which the home location register (HLR) comprises a terminating IN Category Keying (TICK) associated with the forwarding number.

27. The indexing register according to claim 24, in which the first network is a public switched telephone network (PSTN) and the second network is a public land mobile network (PLMN), and the first network node is a Service Node of the PSTN.

28. The indexing register according to claim 26, in which the Service Node is a Service Control Point (SCP) or an Application Server (AS)) or a Service Capability Server (SCS).

29. A service node for executing a value added service including that of an intelligent network (IN) service, which service node is part of a first network, the first network being interconnectable with a second network, the second network being arranged for providing communications to a subscriber, the service node being arranged to execute the value added service after receiving control of a terminating call to or originating call from the subscriber, the terminating or originating call comprising an indication that the subscriber desires to use the value added service, and when necessary, further directing the terminating or originating call towards a destination associated with the terminating or originating call, wherein the subscriber is subscribed to the second network and is not subscribed to the first network.

30. The service node according to claim 29, wherein the service node is a Service Control Point (SCP) or an Application Server (AS) or a Service Capability Server (SCS).

31. The service node according to claim 29, wherein the call is a terminating call, the control of the terminating call is received by the service node using a Call Forward Unconditional mechanism, and the service node is further arranged to further direct the terminating call towards the subscriber by overriding the Call Forwarding Unconditional mechanism.

* * * * *

UNITED STATES PATENT AND TRADEMARK OFFICE
CERTIFICATE OF CORRECTION

| | | |
|---|---|---|
| PATENT NO. | : 8,644,476 B2 | Page 1 of 1 |
| APPLICATION NO. | : 10/596461 | |
| DATED | : February 4, 2014 | |
| INVENTOR(S) | : Maas | |

It is certified that error appears in the above-identified patent and that said Letters Patent is hereby corrected as shown below:

In the Drawings

In Fig. 1, Sheet 1 of 3, delete "Fig" and insert -- Fig. --, therefor at each occurrence throughout the drawings.

In the Specification

In Column 2, Line 51, delete "redirection'" and insert -- redirections' --, therefor.

In the Claims

In Column 8, Line 11, in Claim 19, delete "vale" and insert -- value --, therefor.

In Column 8, Line 38, in Claim 20, delete "subscribed'." and insert -- subscribed --, therefor.

In Column 9, Line 24, in Claim 28, delete "(AS))" and insert -- (AS) --, therefor.

Signed and Sealed this
Eighth Day of July, 2014

Michelle K. Lee
*Deputy Director of the United States Patent and Trademark Office*